United States Patent
Guan et al.

(10) Patent No.: US 11,814,578 B2
(45) Date of Patent: Nov. 14, 2023

(54) DELAYED GELLING AGENTS

(71) Applicants: ConocoPhilips Company, Houston, TX (US); University of Kansas, Lawrence, KS (US)

(72) Inventors: Huili Guan, Lawrence, KS (US); Cory Berkland, Lawrence, KS (US); Ahmad Moradi-Araghi, Tulsa, OK (US); Jenn-Tai Liang, College Station, TX (US); David R. Zornes, Edmond, OK (US); Riley B Needham, Bartlesville, TX (US); James H. Hedges, Bartlesville, OK (US); Min Cheng, Bartlesville, OK (US); James P. Johnson, Bartlesville, OK (US); Faye L. Scully, Bartlesville, OK (US)

(73) Assignees: CONOCOPHILLIPS COMPANY, Houston, TX (US); UNIVERSITY OF KANSAS, Lawrence, KS (US)

( * ) Notice: Subject to any disclaimer, the term of this patent is extended or adjusted under 35 U.S.C. 154(b) by 51 days.

(21) Appl. No.: 17/319,414

(22) Filed: May 13, 2021

(65) Prior Publication Data
US 2021/0261854 A1 Aug. 26, 2021

Related U.S. Application Data

(62) Division of application No. 16/398,853, filed on Apr. 30, 2019, now Pat. No. 11,390,795, which is a
(Continued)

(51) Int. Cl.
*C09K 8/588* (2006.01)
*C09K 8/88* (2006.01)
(Continued)

(52) U.S. Cl.
CPC ............... *C09K 8/588* (2013.01); *C09K 8/88* (2013.01); *C09K 8/887* (2013.01); *C09K 8/92* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 2,827,964 | A | 3/1958 | Sandiford et al. |
| 3,039,529 | A | 6/1962 | McKennon et al. |

(Continued)

FOREIGN PATENT DOCUMENTS

| | | |
|---|---|---|
| WO | 8907698 A1 | 8/1989 |
| WO | 2005035936 A1 | 4/2005 |

(Continued)

OTHER PUBLICATIONS

Gao, H. W. "Effects of degree of hydrolysis and shear on gelation reaction kinetics and gel strength." 1991 (Technical Report) IIT Research Institute, Natioanl Institute for Petroleum and Energy Research, Barttlesville, Oklahoma. 23 pages.
(Continued)

*Primary Examiner* — John J Figueroa
(74) *Attorney, Agent, or Firm* — Boulware & Valoir, PLLC

(57) ABSTRACT

The invention is directed to delayed gelation agents comprising a degradable polymeric cage containing therein one or more gelation agents. The cage degrades in situ, e.g., in an oil reservoir, thus releasing the gelation agent(s), which can then crosslink second polymers in situ to form a gel.

14 Claims, 5 Drawing Sheets

Related U.S. Application Data division of application No. 15/803,886, filed on Nov. 6, 2017, now Pat. No. 10,323,174, which is a division of application No. 13/156,929, filed on Jun. 9, 2011, now Pat. No. 9,850,425.

(60) Provisional application No. 61/372,747, filed on Aug. 11, 2010.

(51) Int. Cl.
*C09K 8/92* (2006.01)
*E21B 33/138* (2006.01)

(56) References Cited

U.S. PATENT DOCUMENTS

| | | | |
|---|---|---|---|
| 3,412,793 | A | 11/1968 | Needham |
| 3,749,172 | A | 7/1973 | Hessert et al. |
| 3,762,476 | A | 10/1973 | Gall |
| 3,785,437 | A | 1/1974 | Clampitt et al. |
| 3,909,423 | A | 9/1975 | Hessert et al. |
| 4,644,073 | A | 2/1987 | Mumallah et al. |
| 4,683,949 | A | 8/1987 | Sydansk et al. |
| 4,706,754 | A | 11/1987 | Smith |
| 4,744,418 | A | 5/1988 | Sydansk |
| 4,744,419 | A | 5/1988 | Sydansk et al. |
| 4,844,168 | A | 7/1989 | Sydansk |
| 4,986,356 | A | 1/1991 | Lockhart et al. |
| 5,404,951 | A | 4/1995 | Lai et al. |
| 6,279,656 | B1 | 8/2001 | Sinclair et al. |
| 6,387,986 | B1 | 5/2002 | Moradi-Araghi et al. |
| 6,454,003 | B1 | 9/2002 | Chang et al. |
| 6,474,413 | B1 | 11/2002 | Barbosa et al. |
| 6,729,402 | B2 | 5/2004 | Chang et al. |
| 6,984,705 | B2 | 1/2006 | Chang et al. |
| 7,300,973 | B2 | 11/2007 | Chang et al. |
| 7,533,723 | B2 | 5/2009 | Hughes et al. |
| 7,644,764 | B2 | 1/2010 | Berkland et al. |
| 10,323,174 | B2 | 6/2019 | Guan et al. |
| 2005/0106242 | A1* | 5/2005 | Yan ............... A61K 9/0004 514/217 |
| 2006/0046938 | A1 | 3/2006 | Harris et al. |
| 2006/0234870 | A1 | 10/2006 | McCabe et al. |
| 2007/0095534 | A1 | 5/2007 | Hughes |
| 2007/0281869 | A1 | 12/2007 | Drochon et al. |
| 2008/0035344 | A1 | 2/2008 | Odeh et al. |
| 2008/0058229 | A1 | 3/2008 | Berkland |
| 2008/0075667 | A1 | 3/2008 | Berkland et al. |
| 2008/0223578 | A1 | 9/2008 | Berkland et al. |
| 2009/0264321 | A1* | 10/2009 | Showalter ............... C09K 8/512 507/219 |
| 2009/0324693 | A1* | 12/2009 | Lemke ................... A61L 15/34 424/443 |
| 2010/0032160 | A1 | 2/2010 | Wilson et al. |
| 2010/0056399 | A1 | 3/2010 | Berkland et al. |
| 2010/0099587 | A1 | 4/2010 | Welton et al. |
| 2010/0234252 | A1 | 9/2010 | Moradi-Araghi et al. |
| 2010/0292109 | A1 | 11/2010 | Moradi-Araghi et al. |
| 2010/0314115 | A1 | 12/2010 | Moradi-Araghi et al. |

FOREIGN PATENT DOCUMENTS

| | | |
|---|---|---|
| WO | 20060109038 A1 | 10/2006 |
| WO | 2008030758 A1 | 3/2008 |
| WO | 2008112009 A1 | 9/2008 |

OTHER PUBLICATIONS

International Search Report and written opinion for PCT Application No. PCT/US2011/39783 (dated Nov. 2, 2011).

Search Report Issued for GB Application No. 1303651.2 (dated Jul. 6, 2015).

Willhite, P. G.; McDoll, S.; Green, D. W.; Cheng, M.; Jain, R.; Ngyuyen, T. "Development of polymer gel systems to improve volumetric sweep and reduce producing water/oil ratios." 2003 (Annual Report) The University of Kansas Center for Research, Inc. Tertiary Oil Recovery Project. 86 pages.

Johnson, S.; Trejo, J.; Veisi, M.; Willhite, P. G.; Liang, J-T.; Berkland, C. Effets of divalent cations, seawater, and formation brine on positively charged polyethyleneamine/dextran sulfate/chromium(III) polyelectrolyte complexes and partially hydrolyzed polyacrylamide/chromium(III) gelation. (2009) Jounal of Appl. Polymer Sci. 115(2), 1008-1014.

Oglesby, K. D. "Novel single stage water mitigation treatment." 2008 (Technical Report) DOE Prime cooperative Agreement to Penn State Univ.' Stripper Well Consortium. 83 pages.

* cited by examiner

DELAYED GELLING AGENTS

PRIOR RELATED APPLICATIONS

This application is a divisional of U.S. Ser. No. 16/398,853, filed Apr. 30, 2019, which is a divisional of U.S. Ser. No. 15/803,886, filed Nov. 6, 2017, which is a divisional of U.S. Ser. No. 13/156,929, filed Jun. 9, 2011, which is a Non-provisional of, and claims priority to, U.S. Ser. No. 61/372,747, filed Aug. 11, 2010. Each application is incorporated by reference in its entirety.

FEDERALLY SPONSORED RESEARCH STATEMENT

Not applicable.

REFERENCE TO MICROFICHE APPENDIX

Not applicable.

FIELD OF THE INVENTION

This invention relates to compositions and processes for oil field applications. More specifically, this invention relates to degradable polymeric particles or "cages" that contain gelation agents. The cages degrade, or at least partially degrade, on exposure to higher temperatures or changes in pH, thus releasing the gelation agents. The resulting released gelation agents can then crosslink a second polymer to produce gels. In this process, the time required to degrade the particles and release the gelation agents adds significantly to the gelation time. This additional delay in crosslinking could be useful in placing the degradable polymer and further polymer package deep into target zones in oil-bearing formations before setting to stable gels to enhance the production of oil.

BACKGROUND OF THE INVENTION

The water injection method used in oil recovery is where water is injected into the reservoir, usually to increase pressure and thereby stimulate production. Water is injected for two reasons: 1. For pressure support of the reservoir (also known as voidage replacement); 2. To sweep or displace the oil from the reservoir and push it towards an oil production well. Only 5 to 20% of the oil in a reservoir can be typically extracted by natural driving forces in the reservoir, but water injection increases that percentage (known as the recovery factor) and maintains the production rate of a reservoir over a longer period of time.

However, sweep recovery is limited by the so-called "thief zones," whereby water preferentially travels through the more permeable regions or fractured zones of the reservoirs, bypassing the less permeable zones and leaving unswept oil behind.

One means of further improving recovery, therefore, is to partially block thief zones with a polymer gel or other material, thus forcing water through the less permeable regions.

U.S. Pat. Nos. 6,454,003, 6,984,705 and 7,300,973 describe an expandable crosslinked polymeric particle having an average particle diameter of about 0.05 to 10 microns (nano- to microparticle sizes). The particle is highly crosslinked with two crosslinkers, one that is stable and a second that is labile. The excess crosslinking makes the initial particles quite small, allowing efficient propagation through the pores of a reservoir. On heating to reservoir temperature and/or at a predetermined pH or other stimuli, the reversible (labile) internal crosslinks break, allowing the particle to greatly expand by absorbing additional injection fluid, usually water. The initial polymer is sometimes called the "kernel" before its expansion, in analogy to the way a kernel of popcorn "pops" in response to certain stimuli, such as heat.

The unique properties of this expandable particle allow it to fill the high permeability zones and then be expanded in situ so that the swollen particle blocks the thief zones and subsequent injections of fluid are forced to enter the remainder of the reservoir, more effectively sweeping the reservoir.

However, the method is limited in practice because subsequent water injections always remove some of the polymer. Hence the polymer becomes washed out and again presents the problem of allowing the injection fluid to avoid the less permeable zones.

The reason for the washout is not certain, but our own research suggested that the swollen polymer is not in a gel form, thus although viscous, is still a liquid that can be washed out of the porous substrate.

To address this problem, we have previously suggested a number of gelling techniques that serve to stabilize the polymer in situ, making it resistant to washout. See e.g., Ser. No. 12/722,344, filed Mar. 11, 2010 and claiming priority to 61/159,486, filed Mar. 12, 2009; Ser. No. 12/780,792, filed May 14, 2010 and claiming prior to 61/178,768 filed May 15, 2009; Ser. No. 12/815,314 filed Jun. 14, 2010 and claiming priority to 61/186,957 filed Jun. 15, 2009.

However, these patent applications address gelation, and not gelation rate. Thus, one additional problem is that gelation can occur too quickly, thus preventing the polymer from even reaching the deepest zones before it gels.

There are, however, available techniques to slow the gelation rate. For example, complexed multivalent cations such as chromium (III) acetate have been used as crosslinking or gelation agents to gel partially hydrolyzed polyacrylamides (HPAM) as described in U.S. Pat. No. 4,683,949. The delay occurs because of the time required for the complex to dissociate, thus releasing the cations for the gelation reactions to occur. See also U.S. Pat. Nos. 4,644,073 and 4,986,356.

While the complexed multivalent metal crosslinkers described above produce gels at much slower rates than Cr(III) chloride, the rate of gelation is still much too fast for placement of gelant deep into the oil-bearing formations. Thus, what is needed in the art, is a way to further delay the crosslinking of a polymer to allow it to fully penetrate the thief zones before gelation.

SUMMARY OF THE INVENTION

The following abbreviations are used herein:

| | |
|---|---|
| Na-AMPS | Sodium-2-ACRYLAMIDO-2-METHYLPROPANE SULFONATE |
| HPAM | PARTIALLY HYDROLYZED POLYACRYLAMIDES |
| PEI | POLYETHYLENEIMINE |
| PSH | POLYOXYETHYLENE SORBITOL HEXAOLEATE |

This invention describes the composition and the method of use for a novel system to extend the gelation time of water soluble polymers to form in situ gels in oil-bearing formations. This novel delayed gelation agent is produced by placing gelation agents inside a cage such that degradable polymer shell surrounds the gelation agents, preventing their action until the cage degrades and releases the gelation agents. The gelation agents can then react with a second polymer to create a delayed gel in situ.

The polymeric cage can be made of any one or more monomers, wherein the polymer is then crosslinked with a labile crosslinker. Preferred monomers include anionic monomers or sulfonate containing monomers, such as NaAMPS and sodium vinylsulfonate. Other monomers include vinyl sulfate salts like sodium or potassium vinyl sulfates; phenyl vinyl sulfonate salts like sodium or potassium phenyl vinyl sulfate; vinyl phosphate salts like sodium or potassium vinyl sulfate, and other polymerizable anionic monomers which can produce d12-like cages.

In an alternative embodiment, the cage can be made without labile crosslinkers, but stable crosslinkers, and instead the monomer or polymers of the cage degrade in situ. Exemplary degradable polymers include polyethers (e.g. polyethylene glycol), polyesters, polysaccharides, or other degradable polymers known to those skilled in the art. Each of the labile crosslinkers, as described below, can be used at such excess that they become the degradable polymer component, as opposed to mere crosslinker when used at lower concentrations with another polymer.

Where there is a possibility of the gelation agent reacting with the initial monomer, it will be necessary to sequester those reagents during the manufacture of the cage, or the agents can be added afterwards if the cage is sufficiently porous that the gelation agents can enter therein.

Particularly preferred monomers are the sulfonate or sulfate or phosphate containing monomers, such as sodium AMPS, combined with cationic gelation agents such as cationic crosslinkers or multivalent cations, since those gelation agents do not react with the cage monomer.

By "gelation agents" what is meant is any agent that can associate with polymer in situ, and thus form a gel, and preferably does not react with the monomer of the cage, for ease of manufacture. Preferably, the gelation agents include multivalent cation complexes such as Cr(III)-acetate, Cr(III)-propionate or Zr(IV)-lactate or a cationic polymer such as PEI, poly-L-lysine, poly-ε-lysine, polyallylamine, polyvinylamine and other polymers or copolymers containing positively charged groups, or combinations thereof. Such gelation agents will react with carboxyl groups or other negatively charge groups on the second polymer, thus causing them to associate and thus form a gel in situ, preventing the polymer from wash-out. In particularly preferred embodiments, the multivalent ion is complexed, thus further delaying the gelling reaction.

The second polymer can be any polymer co-injected with the cage that can then be crosslinked by the gelation agent. In preferred embodiments, the second polymer is an anionic polymer, and in particularly preferred embodiments, the second polymer is an anionic polymer that can be expanded in situ, as is described in Ser. No. 12/797,402, filed Jun. 10, 2009.

In some embodiments, the second polymer can comprise the polymeric material of the cage, e.g., where the cage is constructed of both labile and stable crosslinkers, and thus polymer remains after the labile crosslinkers degrade, e.g, the cage only partially degrades. In other embodiments, the second polymer is a mixture thereof with an additional polymer.

The novel compositions described herein extend gelation times far beyond a few hours observed for Cr(III) acetate and the like, under similar conditions of salinity/hardness and temperature and our experiments prove that gelation is significantly delayed.

In one embodiment, complexed multivalent cations such Cr(III)-acetate, Cr(III)-propionate or Zr(IV) lactate, or PEI, polylysine, polyallylamine, polyvinylamine and the like are trapped in cages of degradable crosslinked sodium AMPS or other sulfonate containing monomers. The crosslinkers used to produce such cages are quite labile and their e.g., ester-type crosslinked bonds break down as a result of exposure to higher temperatures or differing pH values. Under such conditions, the gelation agents are released to crosslink with the anionic groups of a second polymer, such as partially hydrolyzed polyacrylamide, or other carboxylate containing polymers to produce gel in target zones.

In one embodiment, the degradable cage is formed by polymerization of sodium 2-acrylamido-2-methylpropane sulfonate (sodium AMPS) in presence of a low molecular weight (258) polyethylene glycol diacrylate, and a gelation agent such as Cr(III) acetate and/or PEI, to create labile ester linkages in forming the shell. The ester linkages of this unique composition will break when exposed to heat or differing pH values to release the gelation agents, such as complexed multivalent cations and cationic polymers, which can further crosslink with carboxylate containing polymers to produce gels. The advantage of these compositions over conventional complexed crosslinkers is extension of gelation time from weeks to months for in-depth placement into the reservoir.

By "polymer" what is meant herein is a polymerized monomers, including mixtures of two or more different monomers. The polymer can be an off the shelf polymer, or made as needed by polymerizing monomers.

The "labile crosslinker" is defined herein to be any crosslinker that decays or is reversible on application of a particular stimulus, such as irradiation, acidic or caustic pH, temperature, etc. and combinations thereof. Representative labile crosslinkers include acrylate or methacrylate esters of di, tri, tetra hydroxy compounds including ethyleneglycol diacrylate, polyethyleneglycol diacrylate, trimethylolpropane trimethacrylate, ethoxylated trimethylol triacrylate, ethoxylated pentaerythritol tetracrylate, and the like; divinyl or diallyl compounds separated by an azo such as the vinyl or allyl esters of di or tri functional acids, and combinations thereof. Preferred labile crosslinkers include water soluble diacrylates such as polyethylene glycol diacrylates (PEG 200-1000 diacrylate, preferably PEG 258 diacrylate, PEG 200 diacrylate and PEG 400 diacrylate), and polyfunctional vinyl derivatives of a polyalcohol such as ethoxylated (9-20) trimethylol triacrylate and polymethyleneglycol diacrylate.

US2008075667, herein incorporated by reference, describes additional acid labile ketal crosslinkers that can be used in the invention. Such acid labile ketal crosslinker have the formula:

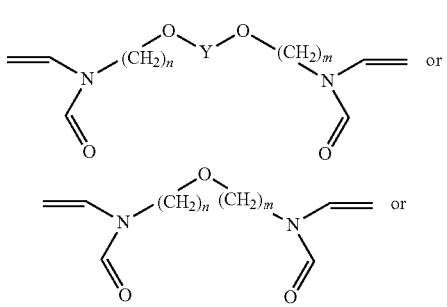

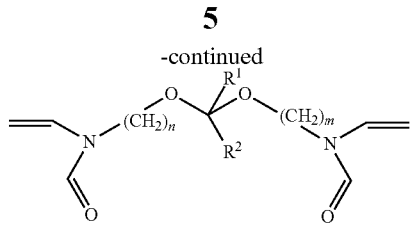

where wherein n and m are independently an integer of between 1 and 10 and wherein R1 and R2 are independently a lower alkyl and Y is a lower alkyl. In particular, 2-bis[2,2'-di(N-vinylformamido)ethoxy]propane (BDEP) and 2-(N-vinylformamido)ethyl ether (NVFEE) are described and may be suitable in acidic environments, or where the acid is later added thereto. Such cross linkers can be advantageously combined with the monomers described therein, such as N-vinyl formamide, N-vinylacetamide, N-vinylacetamine and copolymers thereof, and may be preferred where the neurotoxic effects of acrylamide are to be avoided.

A "stable crosslinker" is defined herein to be any crosslinker that is not degraded under the stimulus that causes the labile crosslinker to disintegrate. Representative non-labile crosslinkers include methylene bisacrylamide, diallylamine, triallylamine, divinyl sulfone, diethyleneglycol diallyl ether, and the like and combinations thereof. A preferred non-labile crosslinker is methylene bisacrylamide.

Other crosslinkers include, but are not limited to, diacrylyl tertiary amides, diacrylylpiperazine, DATD (diallyltartardiamide), DHEBA (dihydroxyethylene-bis-acrylamide), and BAC (bis-acrylylcystamine), trimethylolpropane trimethacrylate (TMPTMA), propyleneglycol triacrylate (PGTA), tripropyleneglycol diacrylate (TPGDA), allyl methacrylate (AMA), triethyleneglycol dimethacrylate (TEGDMA), tetrahydrofurfuryl methacrylate (TFMA) and trimethylolpropane triacrylate (TMPTA). Multifunctional crosslinkers include, but are not limited to, pentaerythritol triacrylate, 1,5 pentane diol dimethacrylate, and pentaerythritol triallylether.

By "multivalent cation" what is meant is a multivalent metal cation, such as chromium, iron, vanadium, aluminates, borates, titanium, zirconium, aluminum, and their salts, chelates and complexes thereof. Complexed or chelated metal cations are preferred because they further slow the rate of gelation, as are nanoparticles that slowly release metal ions.

By "complex" or "complexed" what is meant is that the polyvalent cation is present with or within another molecule that will release the metal ions under the conditions of use, and includes the use of metal salts, chelates, nanoparticles, and the like.

Preferred complexed multivalent cations are multivalent cations complexed as a carboxylate salt, such as formate, carbonate, bicarbonate, acetate, propionate, butyrate, lactate, citrate, succinate, fumarate, malate, malonate, tartrate, benzoate, and the like.

Exemplary polyvalent metal gelation agents useful in the practice of the present invention are complexes or chelates of $Al^{3+}$, $Fe^{3+}$, $Cr^{3+}$, $Ti^{4+}$, $Sn^{4+}$, $Zr^{4+}$ and the like. Preferred gelation agents contain $Al^{3+}$, $Zr^{4+}$ or $Cr^{3+}$, and their acetates, tartrates, malonates, propionates, benzoates, or citrates thereof, and the like. Combinations of polyvalent cationic gelation agents can also be used.

Chromium and zirconium are the preferred multivalent cations in high salinity brines including hard brine. High salinity brine contains on the order of at least about 30,000 ppm total dissolved solids. Thus, the combination of the particular chelating or sequestering agent in conjunction with the preferred chromium(III) and Zr(IV) cations confers high brine tolerance.

Representative anionic monomers that can be used include the following acids and their sodium, potassium and ammonium salts: acrylic acid, methacrylic acid, maleic acid, itaconic acid, 2-propenoic acid, 2-methyl-2-propenoic acid, 2-acrylamido-2-methyl propane sulfonic acid, sulfopropyl acrylic acid and other water-soluble forms of these or other polymerizable carboxylic or sulfonic acids, sulfomethylated acrylamide, allyl sulfonic acid, vinyl sulfonic acid, and the like. Preferred anionic monomers include sodium AMPS and sodium vinylsulfonate.

Representative nonionic monomers include N-isopropylacrylamide, N,N-dimethylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), maleic anhydride, N-vinyl pyrrolidone, vinyl acetate and N-vinyl formamide. Preferred nonionic monomers include acrylamide, N-methylacrylamide, N,N-dimethylacrylamide and methacrylamide. N-vinyl formamide, N-vinylacetamide, N-vinylacetamine and copolymers may be preferred with the acid labile ketal crosslinkers of US2008075667.

The solvent of the system is an aqueous liquid, such as deionized water, potable water, fresh water, or brine having a total dissolved solids concentration up to the solubility limit of the solids in water. Inert fillers known in the art may also be added to the system if desired or for use as proppants. Such fillers include crushed or naturally fine rock material or glass beads, sand and the like.

The cage particles can be prepared by methods known in the art, including the inverse emulsion polymerization technique described in U.S. Pat. Nos. 6,454,003, 6,729,402 and 6,984,705. Particle suspensions are prepared by mixing the particles and injection fluid or by mixing particles in an inverse suspension with shearing and/or a surfactant and additional injection fluid if needed.

In addition to the polymeric cage, gelation agents and second polymer, the aqueous solution may also contain other conventional additives including chelating agents to remove polymerization inhibitors, pH adjusters, initiators and other conventional additives, accelerators, retardants, surfactants, stabilizers, etc., as appropriate for the particular application.

DESCRIPTION OF EMBODIMENTS OF THE INVENTION

This invention provides a novel degradable polymeric cage containing a gelation agent that can delay the gelation of second polymers by delaying the release of gelation agent until the polymeric cage degrades.

In an example of such composition, PEI/Cr(III)-acetate is encapsulated in a degradable crosslinked poly(Na-AMPS) particles shell, which can delay the release of PEI and Cr(III)-acetate for further gelation with anionic water-soluble polymers. Such novel polymeric particles have particular utility in delayed gelation of anionic polymers for placement of gels in target zones deep into oil- or gas-bearing formations.

Figure 1:
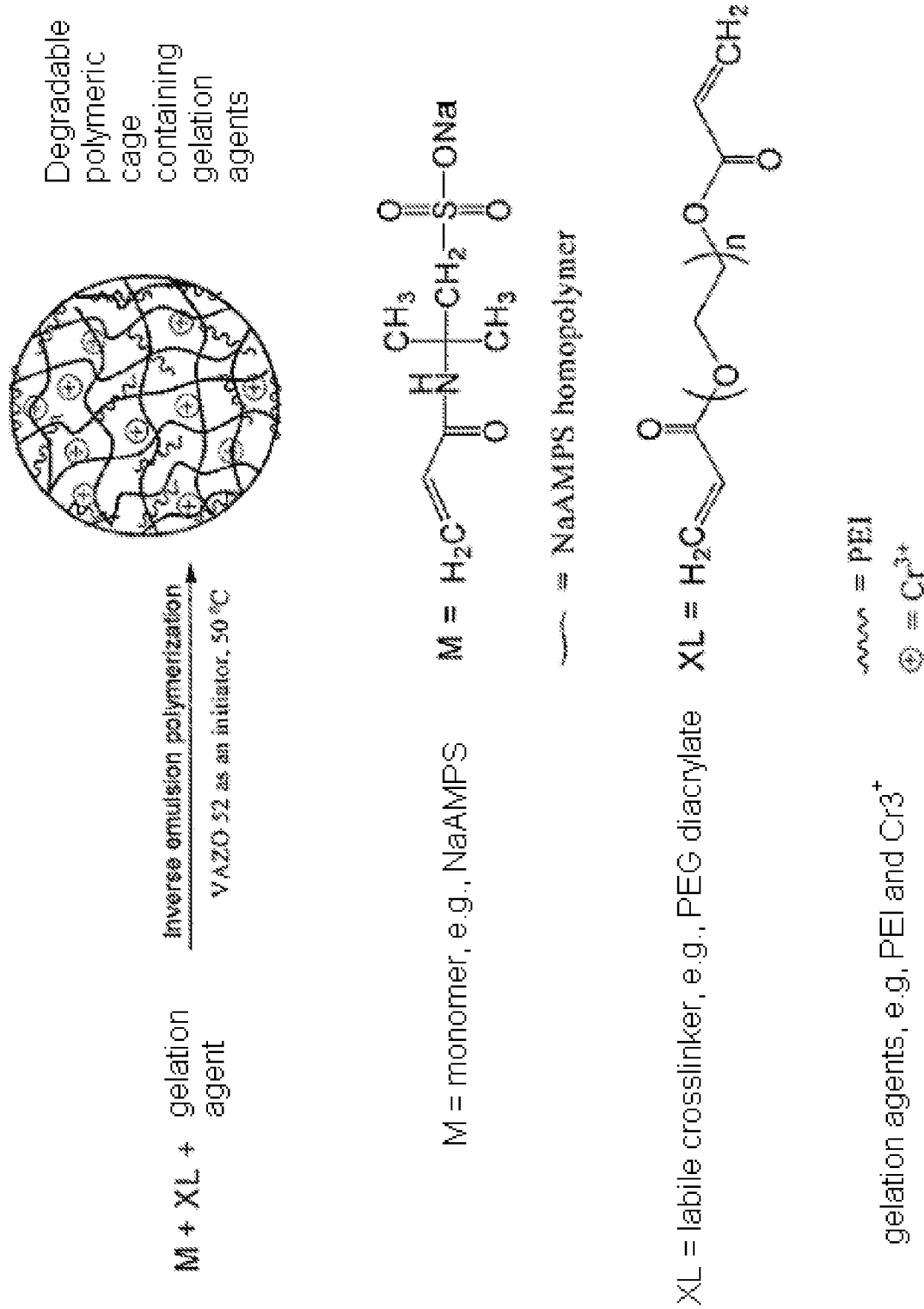
FIG. 1: Synthesis of (multivalent cations)-loaded crosslinked polymeric particles.

A schematic of the inventive polymers is provided in FIG. 1.

The following examples are illustrative only and should not serve to unduly limit the invention.

Example 1: Na-AMPS Cage Containing Pei/Chromium

A representative multivalent cations and cationic polymer-loaded crosslinked polymeric particle or cage, herein referred to as "d12" was prepared using an inverse-emulsion polymerization.

In such process, an aqueous mixture containing 22 g of 50% sodium 2-acrylamido-2-methylpropane sulfonate (sodium AMPS), 10 g of 50% PEI (2000 Mw), 6.5 g distilled water, 35 mg poly(ethylene glycol) (258) diacrylate, 1.61 g Chromium (III) acetate hydroxide $(CH_3COO)_7Cr_3(OH)_2$ as the dispersed phase (6400 ppm $Cr^{3+}$) and an oil mixture of 20 g kerosene, 3.2 g Span 83 and 1.8 g polyoxyethylene sorbitol hexaoleate (PSH) as continuous phase were prepared.

The inverse-emulsion was prepared by mixing the aqueous phase and the oil phase, followed by rapid homogenization using a homogenizer. After adding the emulsion and 20 mg VAZO® 52 as an initiator into a 250 ml flask and purging this mixture with nitrogen for 15 minutes, polymerization was carried out in 50° C. oil bath for 7 hours. VAZO® 52 is a low-temperature polymerization initiator, whose rate of decomposition is first-order and is unaffected by contaminants such as metal ions.

Example 2: Na-Vinyl Sulfonate Cages Containing PEI/Chromium

In this example, we replaced sodium AMPS with sodium vinyl sulfonate (sodium VS) as a monomer in the synthesis of Example 1 above.

A representative multivalent cations and cationic polymer-loaded crosslinked polymeric particle, here forth referred to as "d12S" was prepared containing 6400 ppm Cr(III) using inverse-emulsion polymerization. In such process, an aqueous mixture containing 30 g of 25% sodium VS, 8 g of 50% PEI (2000 Mw), 34 mg poly(ethylene glycol) (258) diacrylate, 1.60 g chromium (III) acetate hydroxide $(CH_3COO)_7Cr_3(OH)_2$ as the dispersed phase and an oil mixture of 20 g kerosene, 3.2 g Span 83 and 1.8 g PSH as continuous phase were prepared.

The inverse-emulsion was prepared by mixing the aqueous phase and the oil phase, followed by rapid homogenization using a homogenizer. After adding the emulsion and 20 mg VAZO® 52 as an initiator into a 250 ml flask and purging this mixture with nitrogen for 15 minutes, polymerization was carried out in 50° C. oil bath for 7 hours.

Example 3: Na-AMPS Cage Containing PEI

A representative cationic polymer-loaded crosslinked polymeric particle or cage, herein referred to as "d12-[no Cr]" was prepared using an inverse-emulsion polymerization.

In such process, an aqueous mixture containing 22 g of 50% sodium 2-acrylamido-2-methylpropane sulfonate (sodium AMPS), 10 g of 50% polyethyleneimine (2000 Mw), 8.1 g distilled water, 35 mg poly(ethylene glycol) (258) diacrylate as the dispersed phase and an oil mixture of 20 g kerosene, 3.2 g Span 83 and 1.8 g polyoxyethylene sorbitol hexaoleate (PSH) as continuous phase were prepared.

The inverse-emulsion was prepared by mixing the aqueous phase and the oil phase, followed by rapid homogenization using a homogenizer. After adding the emulsion and 20 mg VAZO® 52 as an initiator into a 250 ml flask and purging this mixture with nitrogen for 15 minutes, polymerization was carried out in 50° C. oil bath for 7 hours. VAZO® 52 is a low-temperature polymerization initiator, whose rate of decomposition is first-order and is unaffected by contaminants such as metal ions.

Example 4: Synthesis of Other Compounds

The above examples can be repeated to include other positively charged polymers such as polylysine, poly(allylamine) etc. to replace PEI described in Examples 1 and 2 above. Alternatively, the PEI can be omitted, and the multivalent cation can be the sole gelation agent.

Example 5: Extending Delay

This process can also be expanded to a range of gelation delay, from one week to 3 months. This can be accomplished by varying the concentration or the composition of XL (labile crosslinker) in Scheme 1.

Example 6: Delayed Gelation

The gelation agent-loaded polymeric cages of this invention were predicted to delay the gelation of both HPAM and other anionic polymers, such as B29, a swellable copolymer of acrylamide and sodium acrylate crosslinked with poly (ethylene glycol) (258) diacrylate and methylene bisacrylamide.

We sought to test the delayed gelation using Synthetic Brine A. Generally speaking, the polymeric cage particles d12 were mixed with Synthetic Brine A and a second polymer, set at 75° C. and the viscosity of the solutions measured at intervals to determine the rate of gelation of the second polymer. The second polymer can be an ordinary polymer, or is preferably a swellable polymer that swells in situ, such as is described above.

| Composition of Synthetic Brine A | | |
|---|---|---|
| Component | Unit | Value |
| pH | — | 8.0 |
| Specific Gravity @ 60 F. | — | 1.0186 |
| Bicarbonate | mg/l | 1621 |

| Composition of Synthetic Brine A | | |
|---|---|---|
| Component | Unit | Value |
| Chloride | mg/l | 15330 |
| Sulfate | mg/l | 250 |
| Calcium | mg/l | 121 |
| Potassium | mg/l | 86.9 |
| Magnesium | mg/l | 169 |
| Sodium | mg/l | 11040 |
| Strontium | mg/l | 7.6 |

Gelation of HPAM with Degradable Polymeric Cages (D12):

0.78 g of 30% inverting surfactant and 25 g of 2% HPAM were added into 72.66 g of deoxygenated Synthetic Brine A in a beaker with stirring in an oxygen-free glove box; and then 1.56 g of degradable polymeric cage particles containing Cr(III)-Acetate and PEI (d12) was added into the above mixture under stirring (final Cr(III) concentration was 100 ppm, final PEI concentration was 1200 ppm); finally the initial viscosity was recorded. The solution was then divided into 6 ml vials and incubated at 75° C. The viscosities of the samples were monitored as a function of time.

Figure 2:
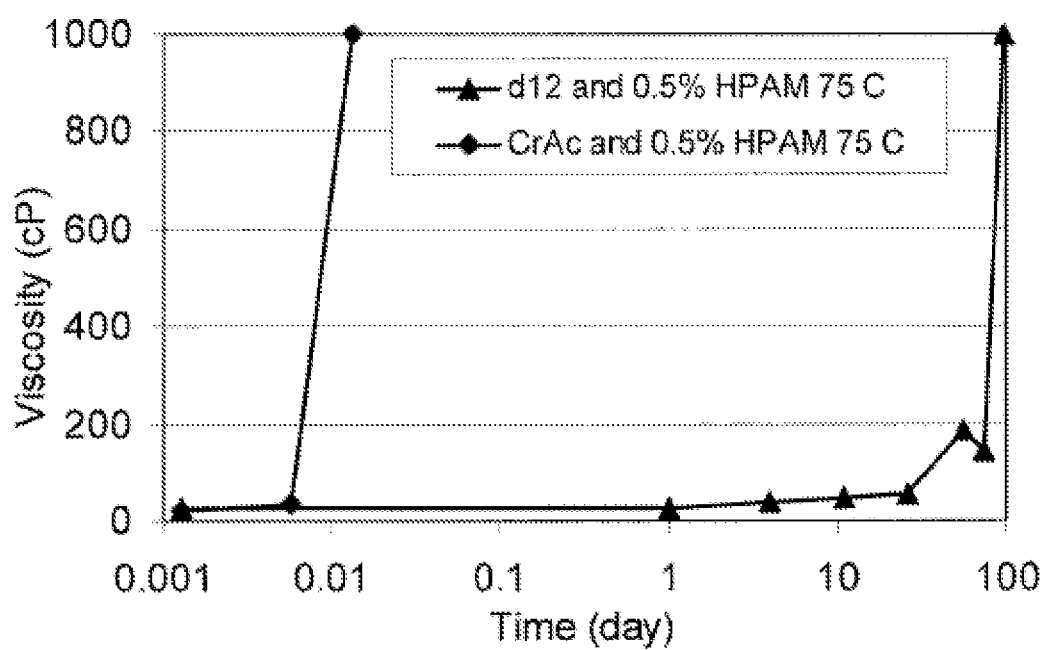
FIG. 2: Comparison of gelation of 0.5% HPAM and d12 (100 ppm $Cr^{3+}$ and 1200 ppm PEI) with 0.5% HPAM and Cr(III) Acetate (100 ppm $Cr^{3+}$) in Synthetic Brine A at 75° C.

The results are shown in FIG. 2. As this figure shows, the delayed release gelation agents forms gels with HPAM at a much slower rate than the prior art complexed multivalent cations used alone to gel HPAM.

Figure 3:
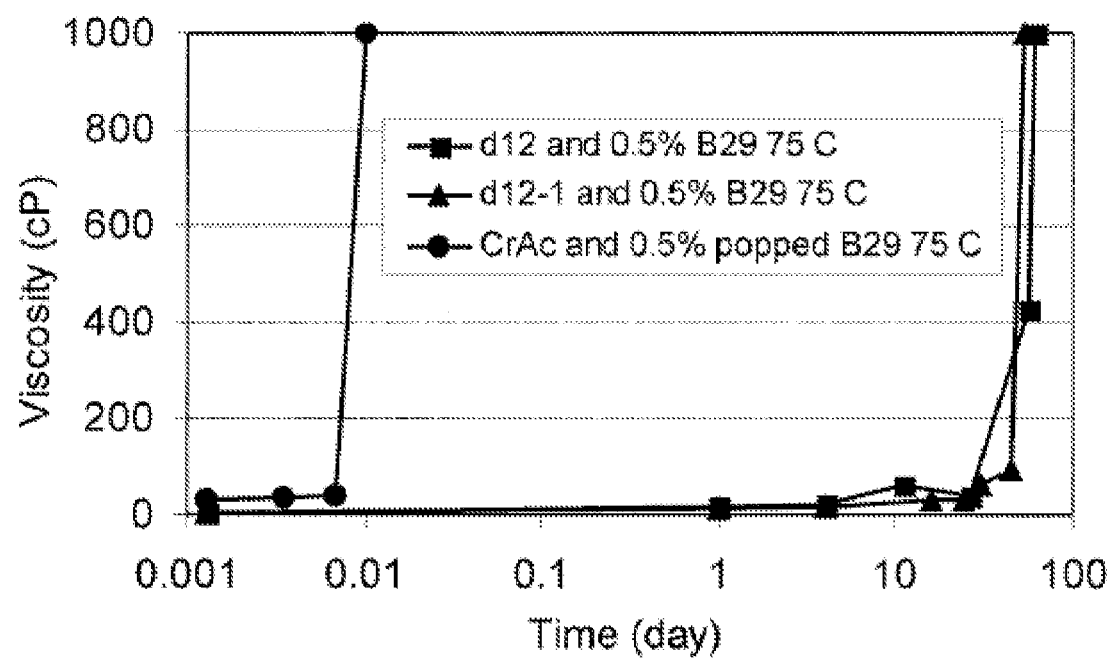
FIG. 3: Comparison of gelation of 0.5% B29 polymer and d12 or d12-1 (100 ppm $Cr^{3+}$ and 1200 ppm PEI) with 0.5% B29 polymer and Cr(III) Acetate (100 ppm $Cr^{3+}$) in Synthetic Brine A at 75° C.

Gelation of B29 with Degradable Polymeric Cages (d12 and d12-1):

1.62 g of 30% inverting surfactant was added into 95.15 g of deoxygenated Synthetic Brine A in a beaker with stirring in an oxygen-free glove box; and then 1.67 g of 30% B29 and 1.56 g of the degradable polymeric particle d12 or d12-1 were added into the above solution under stirring, respectively. The initial viscosity of the solution was determined before dividing the rest of the solution into 6 ml vials. The vials were incubated at 75° C. for various lengths of time before measuring their viscosity of the solution. The results for two degradable crosslinkers d12 and d12-1, a synthetic duplicate of d12, are shown in FIG. 3.

Figure 4:
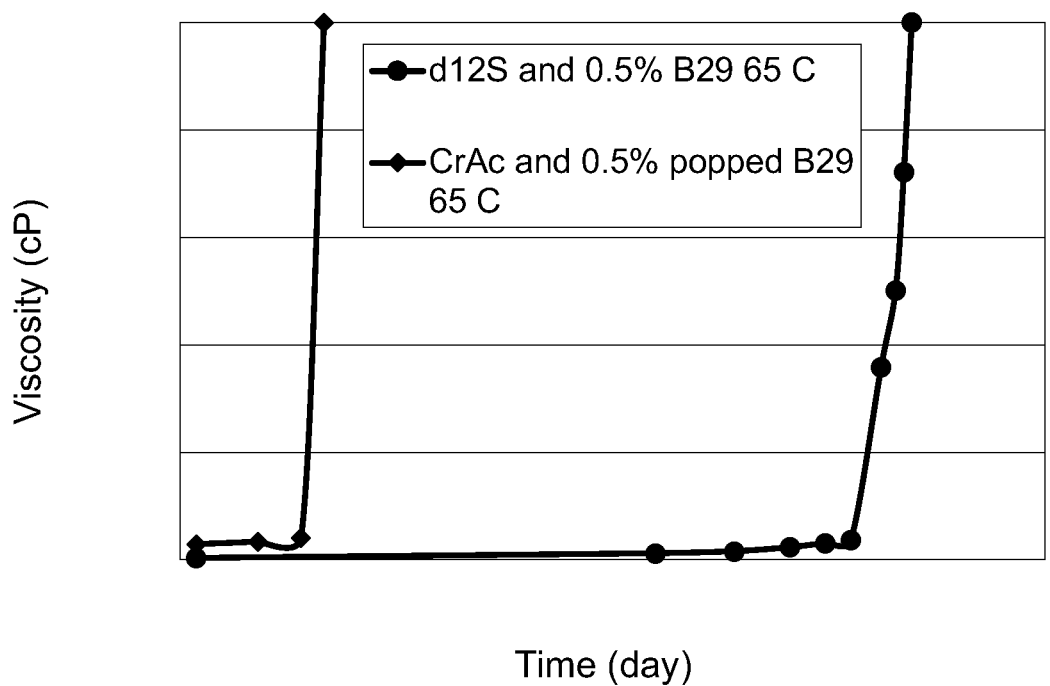
FIG. 4: Comparison of gelation of 0.5% B29 polymer and d12S (100 ppm $Cr^{3+}$ and 1200 ppm PEI) with 0.5% B29 polymer and Cr(III) Acetate (100 ppm $Cr^{3+}$) in Synthetic Brine A at 65° C.

Gelation of B29 with Degradable Polymeric Cages (d12S):

1.62 g of 30% inverting surfactant was added into 95.15 g of deoxygenated Synthetic Brine A in a beaker with stirring in an oxygen-free glove box; and then 1.67 g of 30% B29 and 1.56 g of the degradable polymeric particle d12S were added into the above solution under stirring, respectively. The initial viscosity of the solution was determined before dividing the rest of the solution into 6 ml vials. The vials were incubated at 65° C. for various lengths of time before measuring their viscosity of the solution. The results for d12S are shown in FIG. 4.

Figure 5:
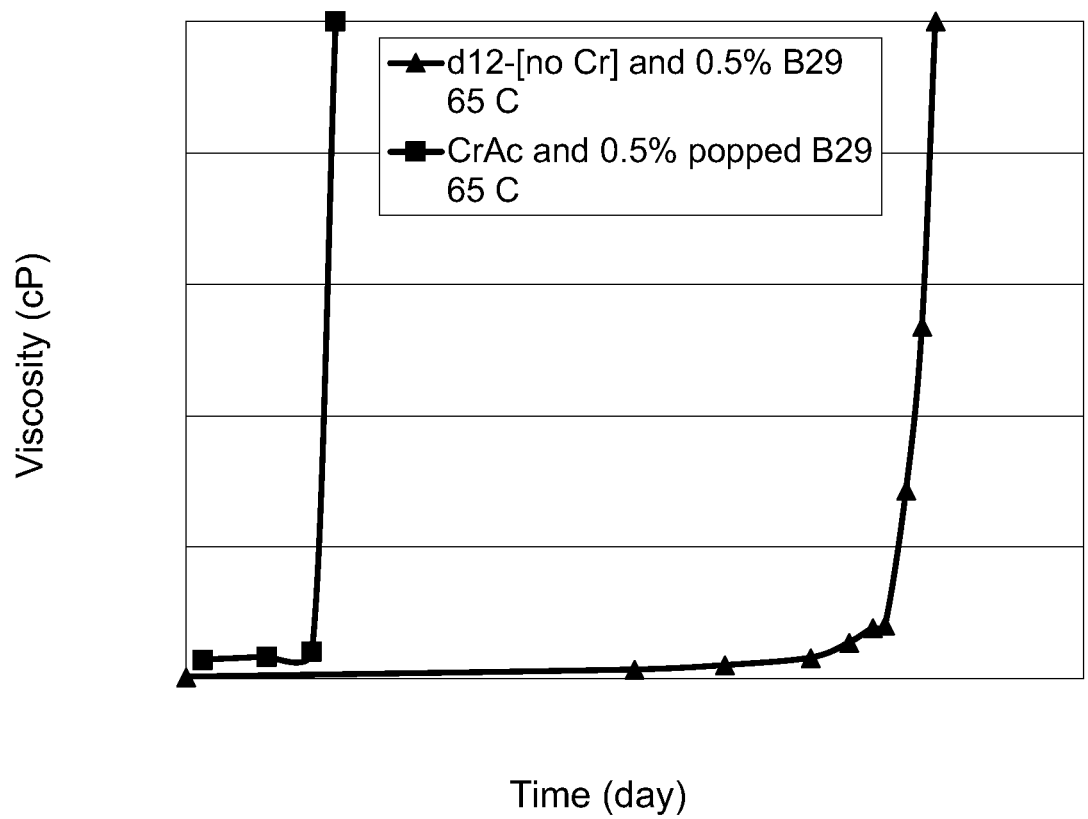
FIG. 5: Comparison of gelation of 0.5% B29 polymer and d12-[no Cr] (PEI 1200 ppm) with 0.5% B29 polymer and Cr(III) Acetate (100 ppm $Cr^{3+}$) in Synthetic Brine A at 65° C.

Gelation of B29 with Degradable Polymeric Cages (d12-[No Cr]):

1.62 g of 30% inverting surfactant was added into 95.15 g of deoxygenated Synthetic Brine A in a beaker with stirring in an oxygen-free glove box; and then 1.67 g of 30% B29 and 1.56 g of the degradable polymeric particle d12-[no Cr] were added into the above solution under stirring, respectively. The initial viscosity of the solution was determined before dividing the rest of the solution into 6 ml vials. The vials were incubated at 65° C. for various lengths of time before measuring their viscosity of the solution. The results for d12-[no Cr] are shown in FIG. 5.

The following references are incorporated by reference herein in their entirety:
U.S. Pat. Nos. 6,454,003, 6,729,402 and 6,984,705
U.S. Pat. No. 4,683,949
U.S. Pat. No. 4,644,073
U.S. Pat. No. 4,986,356
US2008075667

The invention claimed is:

1. A composition comprising:
    a) a degradable polymeric cage comprising a polymer having one or more monomer(s), wherein said polymer is crosslinked with a labile crosslinker to form said cage, wherein the amount of labile crosslinker to monomer(s) is less than 1% by weight;
    b) a gelation agent within said cage that is released upon degradation of said cage; and
    c) an expandable polymeric particle and a fluid comprising water;
wherein said gelation agent can crosslink said expandable polymeric polymer to form a gel when said cage is degraded and said gelation agent is released, and
wherein said expandable polymeric particle comprises partially hydrolyzed polyacrylamide.

2. The composition of claim 1, wherein said one or more monomer(s) are vinylsulfonate salts, vinyl sulfate salts, phenyl vinyl sulfonate salts, vinyl phosphate salts or combinations thereof.

3. The composition of claim 1, wherein said polymer is a polyether, a polyethylene glycol, a polyester, or a polysaccharide.

4. The composition of claim 1, wherein said gelation agent is at least one selected from the group consisting of a cationic crosslinker, $Al^{3+}$, $Fe^{3+}$, $Cr^{3+}$, $Ti^{4+}$, $Sn^{4+}$, $Zr^{4+}$, poly-L-lysine, poly-ε-lysine, polyallylamine, polyvinylamine and complexes or nanoparticles containing same.

5. The composition of claim 1, wherein said expandable polymeric particle contains anionic groups.

6. The composition of claim 1, wherein said expandable polymeric particle contains carboxylate groups.

7. The composition of claim 1, wherein said one or more monomer(s) is sodium 2-acrylamido-2-methylpropane sulfonate and said labile crosslinker is a diacrylate.

8. The composition of claim 1, wherein said gelation agent is a multivalent cation or a cationic polymer or combinations thereof.

9. A composition comprising:
    a) a degradable polymeric cage comprising a polymer having one or more monomer(s), wherein said polymer is crosslinked with a labile crosslinker to form said cage, wherein the amount of labile crosslinker to monomer(s) is <1% by weight; and
    b) a gelation agent within said cage that is released upon degradation of said cage;
wherein said gelation agent comprises chromium and polyethyleneimine, and
wherein said composition extends the gelation time of water soluble polymers by said gelation agent to form in situ gels in oil-bearing formations.

10. The composition of claim 8, wherein the labile crosslinker comprises a polyethylene glycol diacrylate.

11. A delayed gelation composition for use in an oil- or gas bearing formation comprising:
    a) a degradable polymeric cage comprising a polymer having one or more monomer(s), wherein said polymer is crosslinked with a labile crosslinker to form said cage, wherein the ratio of labile crosslinker to monomer(s) is <1% by weight;

b) a gelation agent within said cage, wherein said cage lasts in an oil- or gas-bearing formation for at least 49 days (>7 weeks) before degrading to release said gelation agent;
c) a fluid; and
d) a second polymer that forms a gel with said released gelation agent;

wherein said second polymer comprises partially hydrolyzed polyacrylamide (HPAM).

12. The composition of claim 11, wherein said one or more monomer(s) is sodium 2-acrylamido-2-methylpropane sulfonate and said labile crosslinker is a diacrylate.

13. The composition of claim 12, wherein the labile crosslinker comprises a polyethylene glycol diacrylate.

14. The composition of claim 11, wherein said gelation agent comprises chromium, polyethyleneimine, or both chromium and polyethyleneimine.

* * * * *